United States Patent
Häfner et al.

(10) Patent No.: US 10,537,846 B2
(45) Date of Patent: Jan. 21, 2020

(54) METHOD AND DEVICE FOR SEPARATING CARBON DIOXIDE FROM A GAS STREAM AND FOR REMOVING DEGRADATION PRODUCTS IN THE WASHING MEDIUM BY PHOTOLYTIC DECOMPOSITION

(71) Applicant: Siemens Aktiengesellschaft, Munich (DE)

(72) Inventors: Benjamin Häfner, Langenselbold (DE); Ansgar Kursawe, Niedernhausen (DE); Albert Reichl, Bad Soden (DE); Torsten Schliepdiek, Frankfurt am Main (DE); Rüdiger Schneider, Eppstein (DE); Henning Schramm, Hofheim am Taunus (DE)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 15/129,494

(22) PCT Filed: Mar. 24, 2015

(86) PCT No.: PCT/EP2015/056270
§ 371 (c)(1),
(2) Date: Sep. 27, 2016

(87) PCT Pub. No.: WO2015/154989
PCT Pub. Date: Oct. 15, 2015

(65) Prior Publication Data
US 2017/0120185 A1    May 4, 2017

(30) Foreign Application Priority Data
Apr. 7, 2014 (DE) .................. 10 2014 206 633

(51) Int. Cl.
*B01D 53/14* (2006.01)
*B01D 61/02* (2006.01)

(52) U.S. Cl.
CPC ..... *B01D 53/1425* (2013.01); *B01D 53/1475* (2013.01); *B01D 61/025* (2013.01); *B01D 2252/20494* (2013.01)

(58) Field of Classification Search
CPC ........... B01D 2252/20421; B01D 2252/20426; B01D 2252/20431; B01D 2252/20484;
(Continued)

(56) References Cited

U.S. PATENT DOCUMENTS 7,918,926 B2 * 4/2011 Iijima ................ B01D 53/1425
96/234
2015/0083964 A1 3/2015 Fischer et al.

FOREIGN PATENT DOCUMENTS

DE  102012202703 A1  8/2013
EP  2559473 A1 *  2/2013 ......... B01D 53/1425
(Continued)

OTHER PUBLICATIONS

Machine translation of EP-2559473-A1 accessed Sep. 30, 2018 (Year: 2018).*
(Continued)

*Primary Examiner* — Cabrena Holecek
(74) *Attorney, Agent, or Firm* — Beusse Wolter Sanks & Maire

(57) ABSTRACT

A method for separating carbon dioxide from a gas stream, in particular from a flue gas stream, wherein, a gas stream is brought into contact with a washing medium in an absorber of a separation device and the carbon dioxide contained in the gas stream is separated; the charged washing medium is supplied to a desorber of the separation device to release the carbon dioxide; a vapor stream is removed from the desorber
(Continued)

and is supplied to a cooling unit to form a condensate; degradation products, in particular nitrosamines, contained in at least a partial stream of the condensate are photolytically decomposed to decomposition products; at least the decomposition products, in particular nitrites and amines, are removed; and at least a partial stream of the condensate is returned to the desorber. A corresponding separation device separates carbon dioxide from a gas stream.

37 Claims, 3 Drawing Sheets

(58) Field of Classification Search
CPC ........... B01D 2252/20489; B01D 2252/20494; B01D 2252/504; B01D 53/1425; B01D 53/1475; B01D 53/1493; C10K 1/143; Y02C 10/04; Y02C 10/06; Y02P 20/152
See application file for complete search history.

(56) References Cited

FOREIGN PATENT DOCUMENTS

| | | |
|---|---|---|
| EP | 2559473 A1 | 2/2013 |
| WO | 2013023918 A1 | 2/2013 |
| WO | 2013023919 A1 | 2/2013 |
| WO | 2013043802 A2 | 3/2013 |

OTHER PUBLICATIONS

DE Search Report dated Dec. 19, 2014, for DE application No. 102014206633.6.

International Search Report dated Aug. 31, 2015, for PCT application No. PCT/EP2015/056270.

IPPR (PCT/IPEA/416) dated Jun. 10, 2016, for PCT application No. PCT/EP2015/056270.

* cited by examiner

METHOD AND DEVICE FOR SEPARATING CARBON DIOXIDE FROM A GAS STREAM AND FOR REMOVING DEGRADATION PRODUCTS IN THE WASHING MEDIUM BY PHOTOLYTIC DECOMPOSITION

CROSS REFERENCE TO RELATED APPLICATIONS

This application is the US National Stage of International Application No. PCT/EP2015/056270 filed Mar. 24, 2015, and claims the benefit thereof. The International Application claims the benefit of German Application No. DE 102014206633.6 filed Apr. 7, 2014. All of the applications are incorporated by reference herein in their entirety.

FIELD OF INVENTION

The invention concerns a method for separating carbon dioxide from a gas stream, in particular from a flue gas stream. The invention further concerns a separation device for separating carbon dioxide from a gas stream.

BACKGROUND OF INVENTION

Against the backdrop of climate change, the reduction of harmful substances in the atmosphere is a worldwide goal. This applies in particular to the emission of carbon dioxide ($CO_2$), which accumulates in the atmosphere, preventing the excess heat from escaping into space, and thus leads to an increase in the surface temperature of the Earth due to the so-called greenhouse effect.

In the case of fossil-fired power plants for the production of electrical energy in particular, the burning of fossil fuel results in the production of carbon dioxide-containing flue gas. In order to prevent or reduce the release of carbon dioxide emissions into the atmosphere, the carbon dioxide must be separated from the flue gas. In existing fossil-fired power plants in particular, suitable measures are therefore being considered in order to separate the carbon dioxide generated during combustion from the exhaust gas (post-combustion capture).

As a technical implementation to achieve this, carbon dioxide contained in the flue gas after combustion is washed out of the respective gas stream using a washing medium or an absorption medium in an absorption-desorption process. For this purpose, amine-containing washing media showing good selectivity and a high capacity for carbon dioxide are frequently used.

However, these amine-based washing media tend toward the buildup of nitrosamines. Small amounts of volatile toxic nitrosamines result from secondary flue gas components such as nitrogen oxides ($NO_x$), and small amounts of volatile toxic nitrosamines can be formed because of the generation of small amounts of volatile amines formed by thermal decomposition or oxidative or catalytic breakdown of the washing medium.

The nitrosamines or amines accumulate in the washing medium until a stable equilibrium is reached between the rate of formation of decomposition products or secondary decomposition products (degradation products as a whole) and the rate of their removal from the process. The concentration of degradation products therefore increases over time as the separation process proceeds. Because of the large amounts of flue gas brought into the separation process and the accompanying accumulation of degradation products, these components may be released into the atmosphere via the absorber or contaminate the separated carbon dioxide.

In order to prevent these undesirable emissions, for example, a purification device may be used for the flue gas discharged from the absorber. For this purpose, single or multiple-stage aqueous scrubbers may be configured on the absorber which remove both volatile amines and produced nitrosamines from the carbon-dioxide-purified flue gas stream. However, for the large amounts of flue gases to be cleaned, which can amount to several million cubic meters of flue gas per operating hour, this method is time-consuming and expensive with respect to both investment and operating costs and structural expenditure.

Alternatively, it is possible to configure a purification device downstream from the desorber. A method of this type is known from WO 2013/023918 A1 in which highly volatile degradation products are removed from the absorbent circuit of a $CO_2$ removal process. In this case, the $CO_2$ removal process comprises the absorbent circuit with an absorber and a desorber, wherein condensate is removed from condenser downstream from the desorber and largely purified of degradation products. For this purpose, the condensate is supplied to a purification device in which the condensate is purified of the degradation products contained therein by means of distillation or using an activated carbon scrubber. The purified condensate formed in this manner is again returned to the absorbent circuit. However, the above-described method cannot be economically implemented under certain boundary conditions.

Furthermore, a method is known from EP 2559473 A1 for purifying a product of a process plant which is contaminated with nitrosamines. The contaminated product is treated with UV radiation, thus destroying the nitrosamines. In this case, the product to be purified is the $CO_2$-containing solvent or washing medium contaminated with nitrosamines. According to EP 2559473 A1, one or a plurality of UV radiation sources may be used for irradiation, each of which is connected in a washing medium circuit to a line for a washing medium charged with carbon dioxide, so that the nitrosamines contained in the washing medium are destroyed by UV radiation. The resulting decomposition products can be removed, for example, using an adsorption device.

SUMMARY OF INVENTION

A first object of the invention is to provide a method which allows the controlled and economically feasible removal of degradation products from a washing medium used in removing carbon dioxide from a gas stream in order to prevent or at least significantly reduce the emission of degradation products into the atmosphere.

A second object of the invention is to provide a separation device for separating carbon dioxide from a gas stream by means of which a corresponding method is implementable.

The first object of the invention is achieved by means of a method for separating carbon dioxide from a gas stream, in particular from a flue gas stream, wherein a gas stream is brought into contact with a washing medium in an absorber of the separation device and the carbon dioxide contained in the gas stream is separated, wherein the charged washing medium is supplied to a desorber of the separation device to release the carbon dioxide, wherein a vapor stream is removed from the desorber and supplied to a cooling unit to form a condensate, wherein degradation products contained in at least a partial stream of the condensate, in particular nitrosamines, are photolytically decomposed to decomposition products, wherein at least the decomposition products, in particular nitrites and amines, are removed, and wherein at least a partial stream of the condensate is returned to the desorber.

In a first step, the invention is based on the fact that the emission of degradation products produced in $CO_2$ removal is restricted by law because of its harmful effect on the environment. However, it has thus far only been possible to ensure that the prescribed emission guidelines are met by means of considerable structural expenditure and/or correspondingly high operating costs of the facility components to be used.

In a second step, the invention takes into account the fact that nitrosamines are photolytically decomposed. As a possibility for carrying this out, UV radiation sources are known which are commonly used for ultrapure water and drinking water processing and are commercially available. Use for nitrosamine decomposition in a separation process would therefore be desirable. However, such use is not expedient, because the washing medium itself used for separating carbon dioxide absorbs UV radiation, causing the majority of the energy brought in via the radiation to be converted into heat instead of allowing it to be used for selective nitrosamine destruction.

Taking into account the above, the invention recognizes in a third step that it is possible to carry out selective photolytic decomposition of degradation products, and in particular nitrosamines, contained in the washing medium if irradiation takes place without adversely affecting the washing medium. This can be ensured if, instead of the washing medium, a condensate accumulating during removal is treated that is essentially free of the washing medium used for $CO_2$ removal.

In other words, decomposition of the degradation products takes place photolytically in a condensate instead of in the circuit of the washing medium circulating in the separation process. This prevents the washing medium used from absorbing the UV radiation; it is used only for selective decomposition of undesirable and harmful degradation products in the condensate. In this case, the decomposition products produced in photolytic decomposition, in particular nitrites and amines, are removed, so that any possibility of back formation of nitrosamines can be eliminated.

In particular, the undesirable concentration of nitrosamines or re-formation thereof can be selectively prevented by removing the decomposition products from the separation process. For example, after scrubbing of a partial stream of the condensate which has been purified of decomposition products, the stream may be returned to the desorber, thus reducing the overall concentration of nitrosamines inside the desorber. Alternatively or additionally, it is possible to remove from the process the decomposition products formed in the partial stream together with the condensate and to decrease, for example by means of an external fresh water supply, the nitrosamine concentration in the separation process or in particular in the desorber.

Overall, the method makes it possible to dispense with costly and time-consuming modification of the absorber. Because there is no need for additional absorber scrubbers, there are also no additional amounts of water that would have to subjected to costly post-treatment. Instead, the method offers the possibility of modifying the desorber by means of minor structural alterations in such a way that effective decomposition of undesirable degradation products and subsequent separation of these decomposition products from the washing medium can be carried out.

In this case it is possible to retrofit existing desorbers accordingly, for example if compliance with limit values is to be considered critical due to local circumstances or strict regulatory requirements in specific regions. In such cases, it would not be possible to structurally prepare an absorber for an upgraded washing option, or this would be possible only at great expense.

Removal of the vapor stream, with formation of a condensate, should advantageously take place at the head of the desorber. Here, a vapor steam is removed and supplied to the cooling unit via a steam line. The vapor stream essentially contains carbon dioxide, water, and the volatile degradation products to be removed. In the cooling unit, the vapor stream is cooled and the carbon dioxide separated. At least a partial stream of the condensate leaving the cooling unit is finally treated in such a way that the degradation products contained in the condensate, in particular the nitrosamines, are photolytically decomposed. The decomposition products of the produced in photolytic decomposition are then removed from the partial stream.

In an advantageous embodiment of the invention, the degradation products are photolytically decomposed by UV radiation. The UV radiation decomposes the nitrosamines into nitrites and amines.

In a particularly advantageous embodiment, at least a partial stream of the condensate is removed, with the degradation products contained in the removed partial stream being photolytically decomposed to decomposition products. The partial stream is advantageously removed via a condensate discharge line that is connected to a condensate circuit as a branch line. The nitrosamines contained in the partial stream are photolytically decomposed, advantageously by means of a UV radiation source, accompanied by the formation of nitrites and amines.

The decomposition products produced in decomposition of the nitrosamines are then removed, with said decomposition products advantageously being removed together with the condensate. In other words, the entire partial stream removed via the condensate discharge line is discharged and not supplied to the desorber. In particular, in combination with an external water supply to the desorber, the amount of nitrates and amines, or nitrosamines, contained in the separation process can thus be decreased and undesirable concentration in the process can thus be prevented.

The removed and treated partial stream can then advantageously be supplied to a recovery facility. In this case, supplying the stream to a treatment plant in which the nitrites and amines are broken down by bacteria is particularly advantageous. Here, for example, the stream can be supplied in such a way that the removed condensate and the decomposition products contained therein are collected in a storage tank and then transported to a suitable recovery facility. Alternatively, immediate use of the removed and treated stream—in the immediate vicinity—is also possible.

In order to keep the water balance constant during the separation process, the partial stream removed from a condensate circuit is advantageously replaced with fresh water. The fresh water can be supplied via a corresponding fresh water line which is connected in particular to the condensate circuit. Depending on the volume of the removed partial stream, an equivalent volume of fresh water can be supplied to the process.

The decomposition products are advantageously separated from the condensate in a processing unit. For this purpose, the degradation products contained in a partial stream or alternatively in the entire stream of the condensate are photolytically decomposed in a first step. The partial stream or the entire stream of the condensate with decomposition products contained therein is then supplied to the processing unit. Here, the supply should advantageously be carried out via a condensate return line as part of a condensate circuit. Both the radiation source used for photolytic decomposition and the processing unit used for separation of the decomposition product are advantageously connected to the condensate return line. Processing can be carried out by various methods, such as by means of adsorption processes, absorption processes, or through the use of an ion exchanger.

Particularly, separation of the decomposition products from the condensate takes place by reverse osmosis. Reverse osmosis is a filtration method that allows ionic impurities to be filtered out in the molecular range. In this process, the contaminated liquid, which in the present case is the condensate, is pressed against a semipermeable membrane as a filter medium. The impurities remain on the membrane as a retentate, while the condensate penetrates through the membrane. The condensate penetrating the membrane is referred to as the permeate. This separation in the processing unit results in a small, concentrated flow of decomposition products separated from the condensate, i.e. amines and nitrites, which are advantageously supplied to a recovery facility. The condensate purified in processing, the permeate, is advantageously returned by the processing unit via the condensate return line to the desorber.

The washing medium that has been purified of carbon dioxide and regenerated inside the desorber is advantageously returned to the absorber. Here, the regenerated washing medium advantageously passes through a heat exchanger in which the heat of the regenerated washing medium flowing from the desorber to the absorber is transferred to the charged washing medium flowing out from the absorber and the charged washing medium is correspondingly preheated.

In a particularly advantageous embodiment, the washing medium discharged from the desorber is supplied to a pressure vessel. The pressure vessel or the so-called flash gas compressor is configured in particular for the so-called lean solvent flash method and can be used to improve the energy balance of the separation process. In the lean solvent flash method, the pressure of the washing medium discharged from one desorber is lowered by reducing the pressure inside the pressure vessel, causing a portion of the washing medium to evaporate. This gives rise to a gas phase and a liquid phase. Because of the negligibly low vapor pressure of the active components of the washing medium, the gas phase is essentially composed of carbon dioxide, water vapor, and volatile degradation products, while the liquid phase essentially contains the washing medium and water.

A first partial stream of the washing medium is advantageously supplied from the pressure vessel to the desorber. This first partial stream is a vapor stream, i.e. the above-described gas phase, and the heat required for desorbing the carbon dioxide from the washing medium can be obtained by subsequent condensation of said gas phase inside the desorber. In addition, any carbon dioxide remaining in the washing medium can be returned to the desorber together with the first partial stream as a part of said stream.

As the hottest site, and thus the site with the highest nitrosamine vapor pressure, is the outlet stream from the pressure vessel located at the sump of the desorber, it is particularly advantageous if degradation products contained in the first partial stream of the washing medium, in particular nitrosamines, are photolytically decomposed to decomposition products. Because of the low vapor pressure of the active components of the washing medium, the medium remains in a liquid phase and does not adversely affect irradiation of the first gaseous partial stream.

A second partial stream of the washing medium is advantageously supplied from the pressure vessel to the absorber. Because of the preceding separation of the gas phase inside the pressure vessel, i.e. the first partial stream of the washing medium, this washing medium is almost completely free of absorbed carbon dioxide after it passes through the pressure vessel.

In a further advantageous embodiment of the invention, washing medium removed from the absorber is separated into at least two partial streams. This method is known as the split feed method.

A first partial stream of the washing medium flowing out from the absorber is advantageously supplied to a first desorber stage of the desorber. Here, the first partial stream is a partial stream of the entire stream of washing medium flowing out from the absorber and is supplied to the first desorber stage of the desorber without preheating. This cold partial stream is heated by water vapor rising inside the desorber, and the energy generated on condensation of the water vapor is therefore recovered. Accordingly, the cold water requirement of the cooling unit can be reduced, thus saving on investment costs, for example with respect to the cooling surfaces.

A second partial stream of the washing medium flowing out from the absorber is advantageously supplied to a second desorber stage of the desorber. The second partial stream of the entire stream is preheated for this purpose. The heat supplied to the desorber by the preheated second partial stream allows the thermal energy externally brought into the process for desorption to be reduced. Both the first and the second desorber stage are advantageously operated at predetermined temperatures and pressures.

In order to further improve removal of the degradation products from the condensate, it is possible to use control technology to intervene in the split feed process. This intervention may optionally involve temporarily reducing or completely shutting down the cold first partial stream. This is particularly advantageous in the case of marginally high nitrosamine concentrations, as it is possible in this way to achieve a temperature increase at the desorber head of up to 100° C. Accordingly, there is a massive temporary increase in the concentration of nitrosamines at the desorber head for the duration of reducing and/or shutting down the first partial stream, so that the nitrosamines are more strongly washed out into the condensate of the desorber.

As soon as the concentration of nitrosamines is again within the safe regulatory range, the cold first partial stream can again be switched on in order to carry out the process with the highest possible efficiency. In order to allow this temporary operating mode, a correspondingly dimensioned cooling unit is advantageously used at the desorber head.

The nitrosamines discharged in this embodiment via the condensate can then be photolytically decomposed as described above and removed from the separation process. For this purpose, a partial stream of the condensate is removed, and the degradation products contained in the removed partial streams are photolytically decomposed to decomposition products.

In principle, a combination of the process steps mentioned may be used for decomposition of the degradation products in the method described above, so that optional decomposition of degradation products at various sites on the desorber and selective flushing of said products from the process are possible.

Washing medium flowing out from the desorber should advantageously be supplied to a reboiler. In this case, at least a partial stream of the washing medium removed from the desorber is supplied to the reboiler and regenerated by the steam produced in the reboiler.

An amino acid salt solution is advantageously used as a washing medium. An aqueous amino acid salt solution is advantageous in this case. Amino acid salts are particularly well-suited because of their barely noticeable vapor pressure, which prevents them from being discharged into the atmosphere. An advantageous amino acid salt is a salt of a metal, particularly an alkali metal. Mixtures of different amino acid salts may also be used as active components of the washing medium.

The second object of the invention is achieved by means of a separation device for separating carbon dioxide from a gas stream, in particular from a flue gas stream, comprising an absorber for separating carbon dioxide from the gas stream by means of a washing medium, a desorber fluid-dynamically coupled to the absorber for releasing carbon dioxide absorbed in the washing medium, a cooling unit fluid-dynamically connected to the desorber to form a condensate of a vapor stream that can be removed from the desorber, a branch point arranged between the cooling unit and the desorber for at least a partial stream of the condensate, and a radiation source for photolytic decomposition of degradation products contained in the condensate, in particular nitrosamines, wherein the radiation source is fluid-dynamically configured upstream and/or downstream from the branch point.

By means of such a separation device, degradation products contained in the washing medium can be selectively decomposed and then removed from the process. In this manner, by returning a partial stream of condensate to the desorber—as a partial stream alone or together with additional fresh water—it is possible to prevent undesirable concentration of degradation products in the washing medium and at the same time to at least significantly reduce the emission thereof into the atmosphere. For this purpose, only minor structural additions and/or changes in the desorber are required, which can be carried out with little expense and reasonable cost. Cost-intensive and complex modification of the absorber is not necessary.

In order to supply the washing medium charged with carbon dioxide from the absorber to the desorber, the absorber should advantageously be fluid-dynamically connected via a discharge line to a supply line of the desorber. In the desorber, the carbon dioxide absorbed in the washing medium is released from the washing medium. In order to be able to use the regenerated washing medium in the further process for renewed absorption of the carbon dioxide contained in the flue gas, the desorber is advantageously fluid-dynamically connected via a discharge line to a supply line of the absorber. The washing medium regenerated in the desorber can be returned to the absorber via this fluid dynamic connection.

A steam line is advantageously connected to the desorber at its head, via which the removed vapor can be supplied to the cooling unit. The cooling unit, in which the corresponding condensate is formed from the vapor, can for example be configured with a heat exchanger. Alternatively, the cooling unit can be configured with a direct contact cooler, which is used either alone or in addition to a heat exchanger.

The cooling unit is advantageously connected to a condensate circuit, which comprises a condensate line connected to the cooling unit, via which the condensate formed is discharged from the cooling unit. The condensate line is advantageously connected to a condensate return line for returning the condensate to the desorber. It is also advantageous if a condensate discharge line is connected to the condensate circuit via which a partial condensate stream can be removed from the condensate circuit.

The branch point arranged between the cooling unit and the desorber refers to the point at which at least a partial stream of the condensate is removed.

In this case, the removed partial stream can already be cleaned of decomposition products formed by photolytic decomposition, in particular nitrites and amines. In other words, the decomposition of the degradation products and their removal from the condensate take place before removal of the partial stream of the condensate at the branch point. This is particularly the case for a radiation source configured upstream from the branch point.

Alternatively, in the case of a radiation source configured downstream from the branch point, decomposition of the degradation products and their removal from the separation process are not carried out until after removal of the partial stream at the branch point.

The radiation source used for photolytic decomposition of the degradation products is advantageously a UV-radiation source which decomposes the nitrosamines contained in the condensate. The radiation source is advantageously configured so that it completely irradiates a removed partial stream of the condensate or the entire condensate stream. For this purpose, the radiation source may be directly configured on the condensate discharge line. In particular, it is also possible to use a plurality of UV radiation sources, which for example may be arranged in the flow direction of the removed condensate stream along the condensate discharge line and/or along the condensate return line.

In an advantageous embodiment, the radiation source downstream from the branch point is connected to a condensate discharge line. Via the condensate discharge line, which is connected to the branch point, a partial stream of condensate is advantageously removed from a condensate circuit connected to the desorber.

Advantageously, the condensate discharge line is fluid-dynamically connected with a removal line for removing decomposition products in the condensate formed by the photolytic decomposition of the degradation products, particular nitrites and amines, with said line advantageously leading to a recovery facility, in particular a treatment plant. Via the removal line, in addition to the decomposition products, the condensate is also advantageously removed from the process and can be supplied together with the decomposition products to a recovery facility.

It is also advantageous if the removal line is connected to a storage tank, in which the partial stream of condensate and decomposition products is collected before it is supplied to a recovery facility.

The UV radiation source is advantageously configured in such a way that it irradiates the entire condensate partial stream removed at the branch point. For this purpose, it can be directly arranged on the condensate discharge line. In particular, the use of a plurality of UV radiation sources, which for example can be arranged in the flow direction of the removed condensate along the condensate discharge line, is also possible.

In order to keep the water balance of the process constant, a fresh water line is advantageously fluid-dynamically connected to the coolant circuit, and in particular to a condensate return line of the coolant circuit.

It is also advantageous if the UV radiation source is configured in a condensate return line attached to the cooling unit. The condensate return line is a part of the condensate circuit and is connected to the condensate line of the cooling unit. Configuration of the UV radiation source in the condensate return line allows the condensate flowing out from the cooling unit to be photolytically decomposed.

In order to separate the decomposition products formed in the condensate, the radiation source is more advantageously fluid-dynamically configured downstream from a processing unit. In particular, the processing unit is also configured in the condensate return line. In the processing unit, which advantageously includes a reverse-osmosis system, the decomposition products are separated from the condensate. Via a removal line which is advantageously connected to the processing unit, the separated decomposition products can finally be removed from the process and supplied to a recovery facility. In the case of a processing unit fluid-dynamically configured downstream from the radiation source, the branch point for removing the decomposition products separated from the condensate is advantageously configured in the processing unit.

The condensate purified in the processing unit is returned to the desorber via a connection of the condensate return line to an inlet of the desorber. The supply of purified condensate reduces the concentration of the nitrosamines inside the desorber.

The desorber, or an outlet of the desorber, is advantageously connected to a pressure vessel via a discharge line to a pressure vessel. The washing medium is supplied from the desorber to the pressure vessel, which is configured as a flash gas compressor for carrying out a lean solvent flash method. A gas phase and a liquid phase form in the pressure vessel because of the negative pressure prevailing therein. The gas phase is then returned to the desorber. For this purpose, the pressure vessel is advantageously fluid-dynamically connected via a discharge line to the desorber.

In another embodiment, a UV radiation source is arranged on the discharge line of the pressure vessel. This UV radiation source also causes the nitrosamines contained in the gas supplied to the desorber to be photolytically decomposed.

The pressure vessel is advantageously fluid-dynamically connected to the absorber via a further discharge line. The liquid phase, i.e. the purified washing medium, can therefore be returned from the pressure vessel to the absorber.

It is also advantageous if the absorber is fluid-dynamically connected via a discharge line to a first desorber stage of the desorber. A first partial stream of the washing medium discharged from the absorber is supplied to the desorber via this fluid-dynamic connection without preheating.

In order to achieve a reduction in the additional thermal energy to be brought into the process for desorption, the discharge line of the absorber is advantageously connected to a branch line which is fluid-dynamically connected to a second desorber stage of the desorber. A second preheated partial stream of washing medium discharged from the absorber is supplied to the desorber via this fluid-dynamic connection.

A reboiler is advantageously connected to the desorber. As a so-called sump evaporator, the reboiler provides the regeneration heat required for separating absorbed carbon dioxide from the washing medium. Here, the charged washing medium is regenerated by steam produced in the reboiler. In order to generate steam inside the reboiler, it is usually heated with imported steam, for example from a connected steam power plant.

Because amino acid salts—as active components of the washing medium—have a negligibly low vapor pressure, which prevents undesired release into the atmosphere, an amino acid salt solution, in particular an aqueous amino acid salt solution, is advantageously used as a washing medium.

The advantages given for the method and advantageous improvements thereof can be analogously applied to the separation device and improvements therein.

BRIEF DESCRIPTION OF THE DRAWINGS

In the following, illustrative embodiments of the invention are discussed in greater detail with reference to the drawing. The figures show the following.

DETAILED DESCRIPTION OF INVENTION

Figure 1:
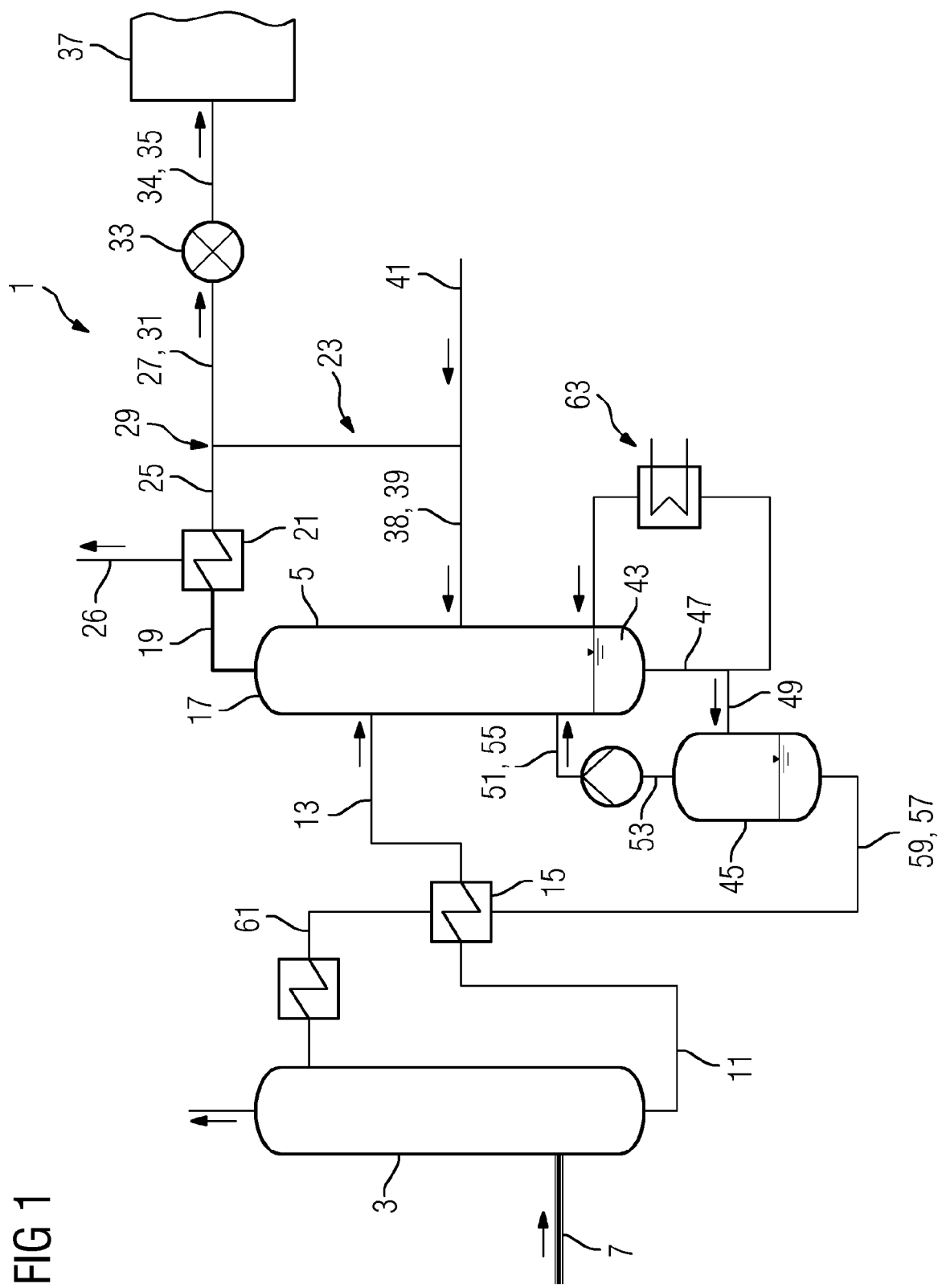
FIG. 1 shows a separation device for separating carbon dioxide from a flue gas stream with a UV radiation source configured downstream from a branch point for decomposing nitrosamines contained in a condensate partial stream.

FIG. 1 shows a separation device 1 for separating carbon dioxide from a flue gas by means of a washing medium. The flue gas is generated on combustion of a fossil fuel. An aqueous potassium-containing amino acid salt solution is used as a washing medium.

The device used for removal 1 comprises an absorber 3 for absorbing carbon dioxide from the flue gas and a desorber 5 fluid-dynamically connected to the absorber 3 for releasing the carbon dioxide absorbed in the washing medium.

For removal of the carbon dioxide from the flue gas, the gas is supplied via a flue gas line 7 to the absorber 3. On entering the absorber 3, the flue gas comes into contact with the washing medium, and the carbon dioxide is absorbed in the washing medium.

The washing medium charged with carbon dioxide leaves the absorber 3 via a discharge line 11 which is connected to a supply line 13 of the desorber 5. During supply to the desorber 5, the charged washing medium passes through a heat exchanger 15 in which it is correspondingly preheated.

In the desorber 5, the carbon dioxide absorbed in the washing medium is released, and it is then removed at the head 17 of the desorber 5 together with water and degradation products via a steam line 19. The vapor stream is cooled in a cooling unit 21 in which a condensate forms. The cooling unit 21 is connected to a condensate circuit 23 which comprises a condensate line 25 connected to the cooling unit 21 via which the condensate formed is removed from the cooling unit 21. The carbon dioxide is removed from the cooling unit 21 via a discharge line 26 connected to said cooling unit and can be supplied for further use and/or storage, which is not shown.

A partial stream 27 of the condensate is removed from the condensate circuit 23 at a branch point 29 via a condensate discharge line 31 connected to the condensate line 25. The branch point 29 is configured downstream from a radiation source 33 in the form of a UV lamp, by means of which the nitrosamines contained in the partial stream 27 removed at the branch point 29 are photolytically decomposed. The nitrites and amines produced by the decomposition are removed as a common partial stream 34 together with the condensate via a removal line 35 and supplied to a recovery facility 37 configured as a treatment plant.

The partial stream 38 of the condensate, in this case the main stream, is returned to the desorber 5. For this purpose, the cooling unit 31 is fluid-dynamically connected via a condensate return line 39, which is part of the condensate circuit 23, to the desorber 5. In order to compensate for the water loss resulting from removal of the partial stream 34, a corresponding volume of fresh water is added. For this purpose, a fresh water line 41 is fluid-dynamically connected to the condensate return line 39.

After desorption of the carbon dioxide from the washing medium, the washing medium collects in the sump at the bottom 43 of the desorber 5. From here, the washing medium is supplied to a pressure vessel 45 configured for carrying out the lean solvent flash method and a so-called flash gas compressor, for which purpose the desorber 5 is connected via a discharge line 47 to a supply line 49 of the pressure vessel 45.

Inside the pressure vessel 45, the pressure of the washing medium is lowered, forming a gas phase and a liquid phase. The gas, i.e. a first partial stream 51 of vaporous washing medium, is supplied to the desorber 5 via a fluid-dynamic connection of a discharge line 53 of the pressure vessel 45 to a supply line 55 of said desorber. By means of subsequent condensation of the vaporous washing medium in the desorber 5, the heat required for desorbing the carbon dioxide from the washing medium can be obtained.

The liquid phase, i.e. the second partial stream 57 of liquid washing medium, is returned to the absorber 3. For this purpose, a discharge line 59 of the pressure vessel 45 is connected to a supply line 61 of the absorber 3. During this return, the regenerated washing medium passes through the heat exchanger 15 and releases heat to the charged washing medium, which is supplied from the absorber 3 to the desorber 5. The regenerated washing medium can be reused in the absorber 3 for absorbing carbon dioxide from a flue gas.

In addition, a reboiler 63 is connected to the desorber 5, which as a sump evaporator provides a part of the regeneration heat for releasing the carbon dioxide absorbed in the washing medium.

Figure 2:
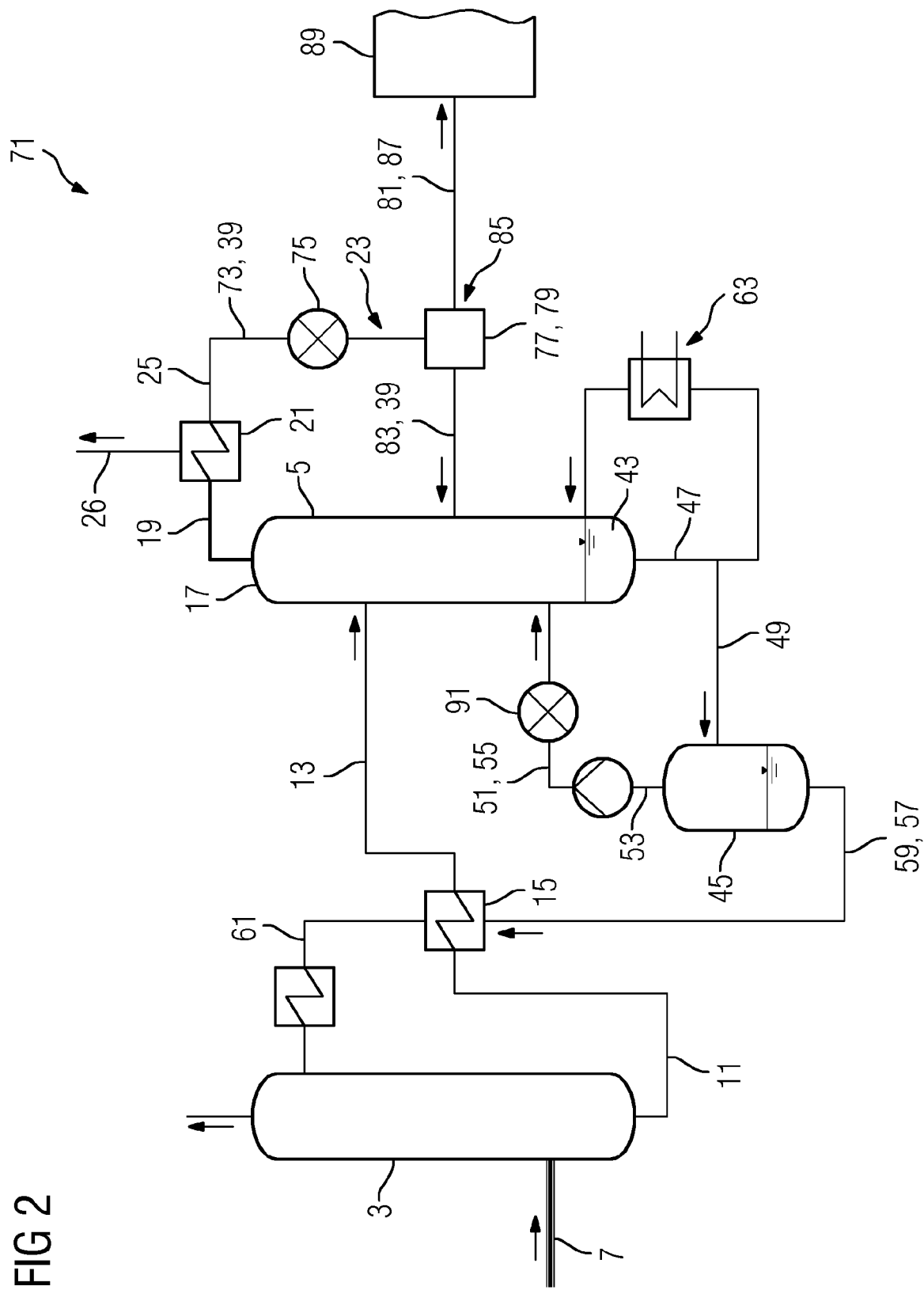
FIG. 2 shows a separation device for separating carbon dioxide from a flue gas stream with a UV radiation source configured upstream from a branch point for decomposing nitrosamines contained in a condensate partial stream.

FIG. 2 shows a further separation device 71 for separating carbon dioxide from a flue gas stream. Here, the system components which are identical to those shown in FIG. 1 are indicated by the same reference numbers.

As in FIG. 1, the charged flue gas in the absorber 3 is brought into contact with the washing medium, and the carbon dioxide in the washing medium is absorbed. After the charged washing medium is supplied to the desorber 5, the carbon dioxide in the desorber 5 is released by thermal desorption. The carbon dioxide is removed at the head 17 of the desorber 5 together with water and degradation products via the steam line 19 in the cooling unit 21, accompanied by formation of a condensate.

In contrast to FIG. 1, in the present case, the entire condensate stream 73 is supplied via the condensate return line 39 of the condensate circuit 23. A condensate discharge line is not included in the separation device 71.

The condensate return line 39 is configured with a UV radiation source 75 which irradiates the entire stream 73 of the condensate with UV radiation and thus photolytically decomposes nitrosamines contained therein into nitrites and amines. A processing unit 77 is fluid-dynamically configured downstream from the UV radiation source 75, said unit serving to separate the decomposition products from the condensate. For this purpose, the processing unit 77 comprises a reverse osmosis system 79 by means of which the nitrites and amines produced are separated as a retentate 81 from the condensate, i.e. the permeate 83, using a semipermeable membrane.

The retentate 81, i.e. substances such as amines and nitrates separated from the water, is separated from the condensate inside the processing unit 77. The branch point 85 for the condensate is therefore formed in the present case in the processing unit 77 as a partial stream and configured downstream from the UV radiation source 75. The decomposition products separated in the processing unit 77, i.e. the retentate 81, are supplied to a recovery facility 89 via a removal line 87 connected thereto. The condensate or permeate 83 itself is again supplied to the desorber 5 via the condensate return line 39.

The washing medium collecting at the bottom 43 of the desorber 5 is supplied to the pressure vessel 45 via the fluid-dynamic connection of the discharge line 47 of the desorber 5 to the supply line 49 of said pressure vessel. The gaseous first partial stream 51 of the washing medium forming inside the pressure vessel is returned to the desorber 5 via the fluid-dynamic connection of the discharge line 53 of the pressure vessel 45 to the supply line 55 of said desorber.

A further UV radiation source 91 is arranged in the supply line 55 to the desorber, by means of which degradation products contained in the gas phase, and particularly nitrosamines, are destroyed. Because of the virtually nonexistent vapor pressure of the washing medium used, UV irradiation of the gas flow at this site is not impaired.

The second partial stream 57 of liquid washing medium is returned to the absorber 3 via the fluid-dynamic connection of the discharge line 59 of the pressure vessel 45 to the supply line 61 of said absorber 3.

Figure 3:
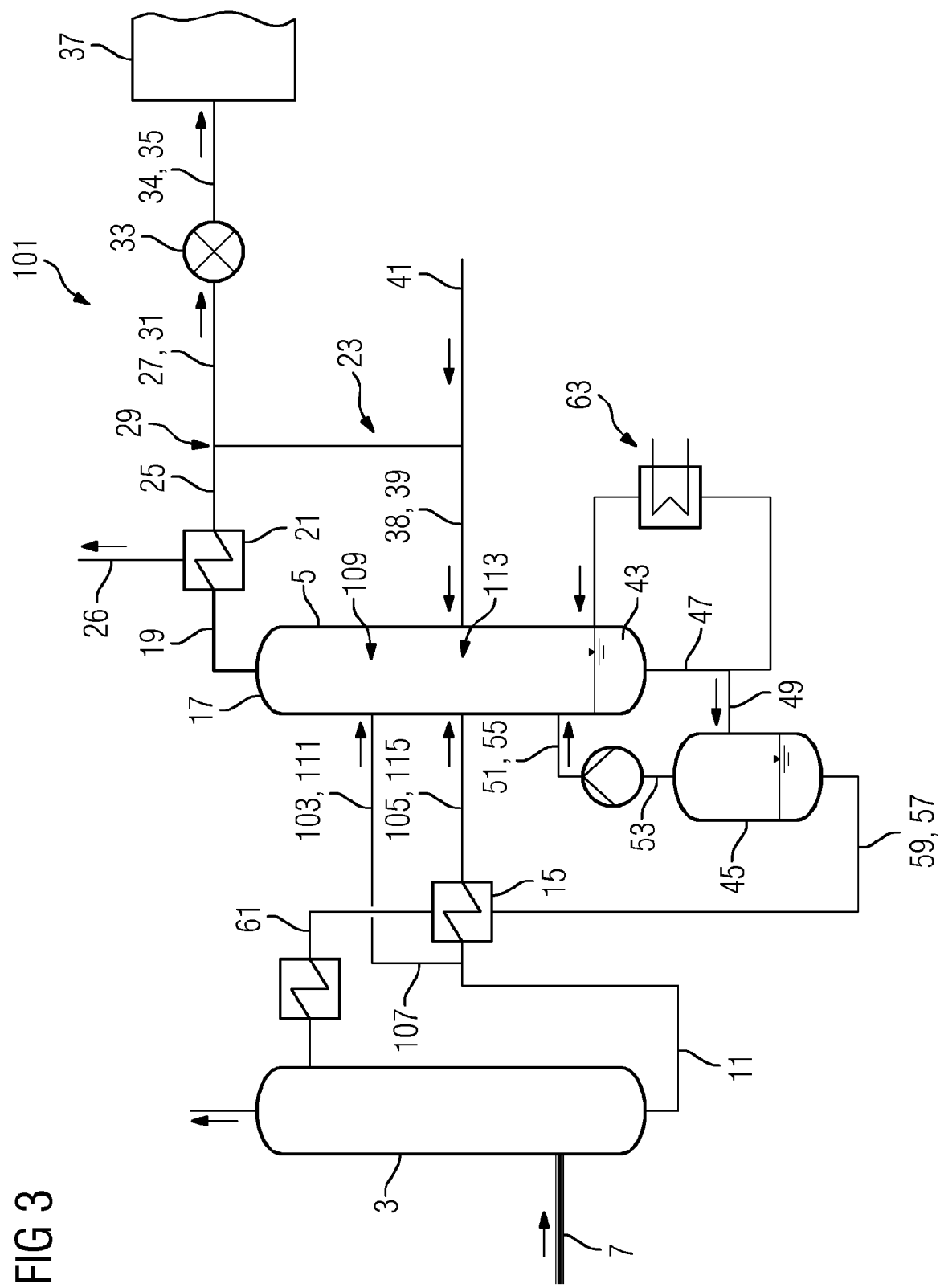
FIG. 3 shows a further separation device for separating carbon dioxide from a flue gas stream with a UV radiation source configured downstream from a branch point for decomposing nitrosamines contained in a condensate partial stream.

FIG. 3 shows a further separation device 101 for separating carbon dioxide from a flue gas by means of a washing medium. In this case as well, the system components identical to those shown in FIGS. 1 and 2 are indicated by the same reference numbers.

The device used for removal 101 comprises the absorber 3 for absorbing carbon dioxide from the flue gas and the desorber 5 for releasing the carbon dioxide absorbed in the washing medium, which is fluid-dynamically connected to the absorber 3. The flue gas to be scrubbed is supplied via the flue gas line 7 to the absorber 3. On entering the absorber 3, the flue gas comes into contact with the washing medium, and the carbon dioxide is absorbed therein.

After absorption of the carbon dioxide inside the absorber 3, the charged washing medium is removed from the absorber 3 via the discharge line 11. In this case, the entire stream is separated in the so-called split feed process of the washing medium into a first partial stream 103 and a second partial stream 105.

The first partial stream 103 is supplied via a branch line 107 connected to a discharge line 11 to a first desorber stage 109 of the desorber 5 configured downstream from the absorber 3. For this purpose, the branch line 107 is fluid-dynamically connected to a supply line 111 of the desorber 5. The first partial stream 103 is supplied to the first desorber stage 109 without preheating at the head 17 of the desorber 5.

The second partial stream 105 is supplied to a second desorber stage 113 of the desorber 5 via a fluid-dynamic connection of the discharge line 11 to a further supply line 115 of the desorber 5. The second partial stream 105 first passes through the heat exchanger 15 and is preheated by the regenerated washing medium returned from the desorber 5.

In the present case, as shown in FIG. 1, the vapor removed from the desorber 5 at its head 17 is supplied to the cooling unit 21 and removed at the branch point 29 of the partial stream 27 of the condensate. The partial stream 27 is irradiated with UV radiation only after removal, so that the branch point 29 is configured upstream from the UV radiation source 33. The nitrites and amines resulting from the photolytic decomposition are removed as a common partial stream 34 together with the condensate via a removal line 35 and supplied to a recovery facility 37.

The main stream 38 of the condensate is returned via the condensate return line 39 to the desorber 5, with the water balance of the separation process being kept constant by the fresh water line 41 connected to the condensate return line 39.

In order to further improve removal of the degradation products from the condensate, the embodiment of the separation device 101 makes it possible to use control technology to intervene in the split feed process. By temporarily reducing or completely shutting down the cold first partial stream 103 at marginally high nitrosamine concentrations, it is possible to achieve a temperature increase at the desorber head 17 of up to 100° C., which also causes a massive temporary increase in the concentration of nitrosamines at the desorber head 17. This causes the nitrosamines contained in the washing medium to be more strongly washed out into the condensate of the desorber.

When the concentration of the nitrosamines again drops, the cold first partial stream 103 can again be switched on, causing the temperature at the desorber head 17 to again drop correspondingly. The cooling unit 21 used at the desorber head 17 is configured accordingly in order to allow this temporary operating mode.

The washing medium collecting during the separation process on the bottom 43 of the desorber 5 is supplied to the pressure vessel 45 in this case as well. Beginning from the pressure vessel 45, the first gaseous partial stream 51 is again supplied to the desorber 5, while the second partial stream 57, in contrast, is supplied to the absorber 3 for reuse as a washing medium for separating carbon dioxide.

The invention claimed is:

1. A method for separating carbon dioxide from a gas stream, the method comprising:
   bringing into contact a gas stream in an absorber of a separation device with a washing medium and separating the carbon dioxide contained in the gas stream in the absorber of the separation device, wherein an amino acid salt solution is used as a washing medium,
   supplying the charged washing medium, in order to release the carbon dioxide to a desorber of the separation device,
   removing a vapor stream from the desorber and supplying the vapor stream to a cooling unit to form a condensate,
   photolytically decomposing degradation products contained in at least a partial stream of the condensate to decomposition products,
   removing at least the decomposition products, and
   returning at least a partial stream of the condensate to the desorber,
   wherein a first partial stream of the charged washing medium from the absorber is supplied to a first desorber stage of the desorber without preheating, and a second partial stream of the charged washing medium from the absorber is supplied to a second desorber stage of the desorber.

2. The method of claim 1, wherein the degradation products are photolytically decomposed by UV radiation.

3. The method of claim 1, wherein the at least a partial stream of the condensate is removed, and wherein the degradation products contained in the removed partial stream are photolytically decomposed to the decomposition products.

4. The method of claim 3, wherein the removed partial stream is replaced by fresh water.

5. The method of claim 1, wherein the decomposition products are removed together with the condensate supplied to a recovery facility.

6. The method of claim 1, wherein the decomposition products are separated from the condensate in a processing unit.

7. The method of claim 6, wherein the decomposition products separated from the condensate in the processing unit are supplied to a recovery facility.

8. The method of claim 6, wherein the purified condensate is returned from the processing unit to the desorber.

9. The method of claim 1, wherein the decomposition products are separated from the condensate by means of reverse osmosis.

10. The method of claim 1, wherein washing medium discharged from the desorber is supplied to a pressure vessel.

11. The method of claim 10, wherein a second partial stream of the washing medium is supplied from the pressure vessel to the absorber.

12. The method of claim 10, wherein a first partial stream of the washing medium is supplied from the pressure vessel to the desorber.

13. The method of claim 12, wherein degradation products contained in the washing medium are photolytically decomposed to decomposition products.

14. The method of claim 13, wherein washing medium which has been purified of decomposition products is supplied to the desorber.

15. The method of claim 13, wherein the degradation products comprise nitrosamines.

16. The method of claim 1, wherein washing medium from the desorber is at least partially supplied to a reboiler.

17. The method of claim 1, wherein the degradation products comprise nitrosamines and the decomposition products comprise nitrites and amines.

18. The method of claim 1, wherein the second partial stream is supplied to the second desorber stage of the desorber preheated.

19. A separation device for separating carbon dioxide from a gas stream, comprising
   an absorber for separating carbon dioxide from the gas stream by means of an amino acid salt solution as a washing medium,
   a desorber fluid-dynamically coupled to the absorber for releasing carbon dioxide absorbed in the washing medium,
   a cooling unit fluid-dynamically connected to the desorber to form a condensate from a vapor stream which is removable from the desorber,
   a branch point arranged between the cooling unit and the desorber for at least a partial stream of the condensate, and
   a radiation source for photolytic decomposition of degradation products contained in the condensate,
   wherein the radiation source is fluid-dynamically connected upstream and/or downstream from the branch point, and wherein the absorber is fluid-dynamically connected to a first desorber stage of the desorber via a discharge line, and a branch line is fluid-dynamically connected to the discharge line and a second desorber stage of the desorber, wherein a first partial stream of charged washing medium from the absorber is supplied to the first desorber stage without preheating via the discharge line, and a second partial stream of charged washing medium from the absorber is supplied to the second desorber stage via the branch line.

20. The separation device of claim 19, wherein the radiation source is a UV radiation source.

21. The separation device of claim 19, wherein the radiation source configured downstream from the branch point is connected to a condensate discharge line.

22. The separation device of claim 21, wherein the condensate discharge line is fluid-dynamically connected to a removal line for removing decomposition products formed by photolytic decomposition of the degradation products in the condensate, said removal line leading to a recovery facility.

23. The separation device of claim 22, wherein the decomposition products comprise nitrites and amines.

24. The separation device of claim 19, wherein the radiation source configured upstream from the branch point is connected to a condensate return line.

25. The separation device of claim 24, wherein a fresh water line is fluid-dynamically connected to the condensate return line.

26. The separation device of claim 19, wherein a processing unit for separating the decomposition products from the condensate is fluid-dynamically configured downstream from the radiation source.

27. The separation device of claim 26, wherein the branch point for removing the decomposition products separated from the condensate is configured in the processing unit.

28. The separation device of claim 26, wherein the processing unit comprises a reverse osmosis system.

29. The separation device of claim 26, wherein a removal line for removing the separated decomposition products is connected to the processing unit, said removal line leading to a recovery facility.

30. The separation device of claim 29, further comprising a heat exchanger fluid-dynamically connected to the branch line and configured to preheat washing medium enroute to the second desorber stage.

31. The separation device of claim 29, wherein the decomposition products comprise nitrites and amines.

32. The separation device of claim 19, wherein the desorber is connected to a pressure vessel via a discharge line.

33. The separation device of claim 32, wherein the pressure vessel is fluid-dynamically connected to the desorber via a discharge line.

34. The separation device of claim 33, wherein a UV radiation source is arranged on the discharge line of the pressure vessel.

35. The separation device of claim 32, wherein the pressure vessel is fluid-dynamically connected to the absorber via a further discharge line.

36. The separation device of claim 19, wherein a reboiler is connected to the desorber.

37. The separation device of claim 19, wherein the degradation products comprise nitrosamines.

* * * * *